Patented May 26, 1942

2,284,156

UNITED STATES PATENT OFFICE 2,284,156

ESTERS OF TERPENE PHENOLS

Fritz Lemmer, Wiesbaden, and Kurt Hultzsch, Wiesbaden-Biebrich, Germany, assignors to The Resinous Products & Chemical Company, Philadelphia, Pa.

No Drawing. Application December 17, 1938, Serial No. 246,502. In Germany January 28, 1938

5 Claims. (Cl. 260—410)

This invention relates to esters prepared from terpene phenols and carboxylic acids and to the method of preparing them.

It is known that terpene phenols can be prepared by condensing phenols and terpenic hydrocarbons or their halogen- or hydroxy-substituted products in the presence of suitable condensing agents. According to the nature of the starting materials and to the conditions of condensation, the resulting product may be a monomeric terpene phenol or a hard, polymeric terpene phenol resin. In either case the product contains free phenolic hydroxyl groups capable of entering into chemical reactions. They may also be condensed with formaldehyde to yield oil-soluble resins. The terpene phenols in monomeric or polymeric form are finding uses in the manufacture of artificial resins and various coating materials.

It is also known that phenols cannot be esterified by heating them with carboxylic acids and that in order to obtain such esters it is necessary to convert the acid to the chloride or anhydride before reacting it with the phenol or else to carry out the esterification in the presence of substances such as phosphorus pentoxide or phosphorus oxychloride.

It has now been found that the terpene phenols can be esterified with monobasic or polybasic carboxylic acids by simply heating the two reactants to a suitable temperature, usually 200 to 280° C. This reaction takes place very easily with the higher fatty acids, resin acids and di- or poly-carboxylic acids as well as with the lower aliphatic carboxylic acids. The reaction takes place readily whether the terpene phenol is in the monomeric or in the polymeric form.

By means of these esterified terpene phenols considerable improvement can be made in various synthetic resins. On account of the relative ease with which they esterify, the terpene phenols can be employed to reduce the acidity of resins having a high acid number and thus yield a new type of oil-soluble synthetic resin. For many purposes terpene phenols or terpene phenol resins are unsuitable because of their instability which is due to the presence of the free phenolic hydroxyl groups. This disadvantage is eliminated by esterifying these phenolic hydroxyl groups and thus durable, very pale, light-resistant resins can be prepared.

The amount of acid necessary to esterify the hydroxyl groups of the terpene phenols can be easily calculated from the acetyl number which is readily determined. If desired, an excess of either reactant may be employed and subsequently removed by washing with alkaline solutions, distilling, or the excess may be esterified with another suitable esterifying agent. Dehydrating catalysts may be employed to accelerate the reaction which may be carried out at any desired pressure.

The esterification may be carried out in the presence of mono- or poly-hydric alcohols or the half-ester of the terpene phenol and a dicarboxylic acid may be further esterified with a mono- or poly-hydric alcohol.

The invention may be illustrated by the following examples but it is not limited to the exact materials and means of operation shown as it may otherwise be practiced within the scope of the appended claims.

*Example 1*

400 parts of a resinous polymer of terpene phenol having an acetyl number of 115 is mixed with 250 parts of rosin and 2 parts of boric acid and heated at 250–260° C. for 15 to 20 hours. At the end of this time the acid number of the resulting resin is less than 20. The product is a very pale resin melting between 80 and 90° C.

*Example 2*

400 parts of a resinous polymeric terpene phenol having an acetyl number of 115, 250 parts of linseed oil fatty acids, and 2 parts of zinc oxide are heated at 230–240° C. for twelve hours. The resulting oily product has an acid number of 14. When exposed to the air, it dries in a manner similar to linseed oil.

*Example 3*

400 parts of a resinous polymeric terpene phenol having an acetyl number of 110, 60 parts of adipic acid and one part of boric acid are heated for 8–10 hours at about 250° C. At the end of this time the acid number of the product is 23. It is a pale brown resin melting at 85–95° C.

*Example 4*

390 parts of an oily monomeric terpene phenol having an acetyl number of 150 and 60 parts of maleic anhydride are heated for 16 hours at about 220° C. The resulting product is a thick, viscous resin having an acid number of 16 and a saponification number 113. It is a very light-resistant material which may be used in the preparation of cellulose ester lacquers.

*Example 5*

320 parts of a resinous polymeric terpene phenol having an acetyl number of 115 and 200 parts of linseed oil fatty acids are heated for 16 hours at 230° C. under a pressure of 15 mm. Hg. The resulting product is an oil having an acid number of 35 and which has drying properties like the product obtained according to Example 2.

The terpene phenol used in the foregoing examples was prepared by condensing 1.4 mols of turpentine with one mol of phenol in the presence of one of the catalysts disclosed in the United States Patent 1,469,709, such as hydrochloric, hydrofluoric or other acids. Other phenols such as the cresols, xylenols, naphthols and their alkylated homologs as well as other terpenes such as pinene, limonene, dipentene, camphene, and terpinene or terpene alcohols may be employed in preparing the terpene substituted phenols. Acids other than those shown in the examples may be used to esterify the terpene substituted phenols. These include monobasic acids such as acetic, propionic, other lower aliphatic acids, palmitic, stearic, etc., dibasic acids such as pimelic, suberic, sebacic, phthalic, etc., as well as tricarboxylic acids such as citric.

In the appended claims the term "terpene phenol" means any phenol having as a nuclear substituent a terpenic radical and which may be in the monomeric or polymeric form.

We claim:

1. A terpene substituted phenol, the phenolic hydroxyl group of which is esterified with a carboxylic acid.

2. A terpene substituted phenol, the phenolic hydroxyl group of which is esterified with a fatty acid.

3. A terpene substituted phenol, the phenolic hydroxyl group of which is esterified with a higher fatty acid.

4. A terpene substituted phenol, the phenolic hydroxyl group of which is esterified with rosin acid.

5. A terpene substituted phenol, the phenolic hydroxyl group of which is esterified with linseed oil fatty acids.

FRITZ LEMMER.
KURT HULTZSCH.